(12) United States Patent
Domer et al.

(10) Patent No.: US 6,583,816 B1
(45) Date of Patent: Jun. 24, 2003

(54) IMAGING CIRCUIT AND METHOD OF SPATIAL COMPENSATION

(75) Inventors: Steven M. Domer, Mesa, AZ (US); Jeffery E. Bills, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/118,684

(22) Filed: Jul. 17, 1998

Related U.S. Application Data

(63) Continuation-in-part of application No. 09/088,005, filed on Jun. 1, 1998.

(51) Int. Cl.$^7$ ............................ H04N 5/235; H04N 3/14
(52) U.S. Cl. ................................. 348/229.1; 348/302
(58) Field of Search .......................... 348/229.1, 362, 348/302, 308

(56) References Cited

U.S. PATENT DOCUMENTS 5,781,233 A * 7/1998 Liang et al. ................. 348/302
5,949,483 A * 9/1999 Fossum et al. ............. 348/302

* cited by examiner

*Primary Examiner*—Wendy R. Garber
*Assistant Examiner*—Rashawn N Tillery

(57) ABSTRACT

An imaging system (10) and method compensate for different amplitudes of pixel signals generated by photoactive devices in an optical sensor (32) whose responses to projected light are not uniform. The sensor is divided into regions (52) such that the response of the photoactive devices within a region are substantially equal. A processing circuit (34) compensates for different responses among different regions with a programmable gain amplifier (72) whose gain is dynamically adjusted when pixel signals generated in different regions are received.

16 Claims, 3 Drawing Sheets

IMAGING CIRCUIT AND METHOD OF SPATIAL COMPENSATION

This is a Continuation-in-part of Ser. No. 09/088,005, filed Jun. 01, 1998.

BACKGROUND OF THE INVENTION

The present invention relates in general to semiconductors, and more particularly to integrated imaging circuits.

High resolution imaging systems such as scanners and digital cameras capture images by projecting light from an object through a lens and onto an optical sensor. A low manufacturing cost and low power operation is achieved by fabricating the sensor on a semiconductor die configured with an array of photoactive sensing devices such as charge-coupled devices, photodiodes, or phototransistors. The photoactive devices respond to the light projected from the object by generating proportional pixel signals which are processed through an imaging circuit to produce viewable imaging data.

In most imaging systems, different regions of the sensor have different responses to the light projected from the image. That is, photoactive devices in different regions of the sensor generate pixel signals of different amplitudes even when the light intensity is the same. Such nonuniformities can be caused by semiconductor process variations across the die, aberrations in a focusing lens or by thermal gradients across the sensor. As a result, objectionable shadows are present in portions of the displayed image.

Hence, there is a need for an improved imaging system that can compensate for different responses to light across different regions of an optical sensor.

DETAILED DESCRIPTION OF THE DRAWINGS

In the figures, elements having the same reference number have similar functionality.

Figure 1:
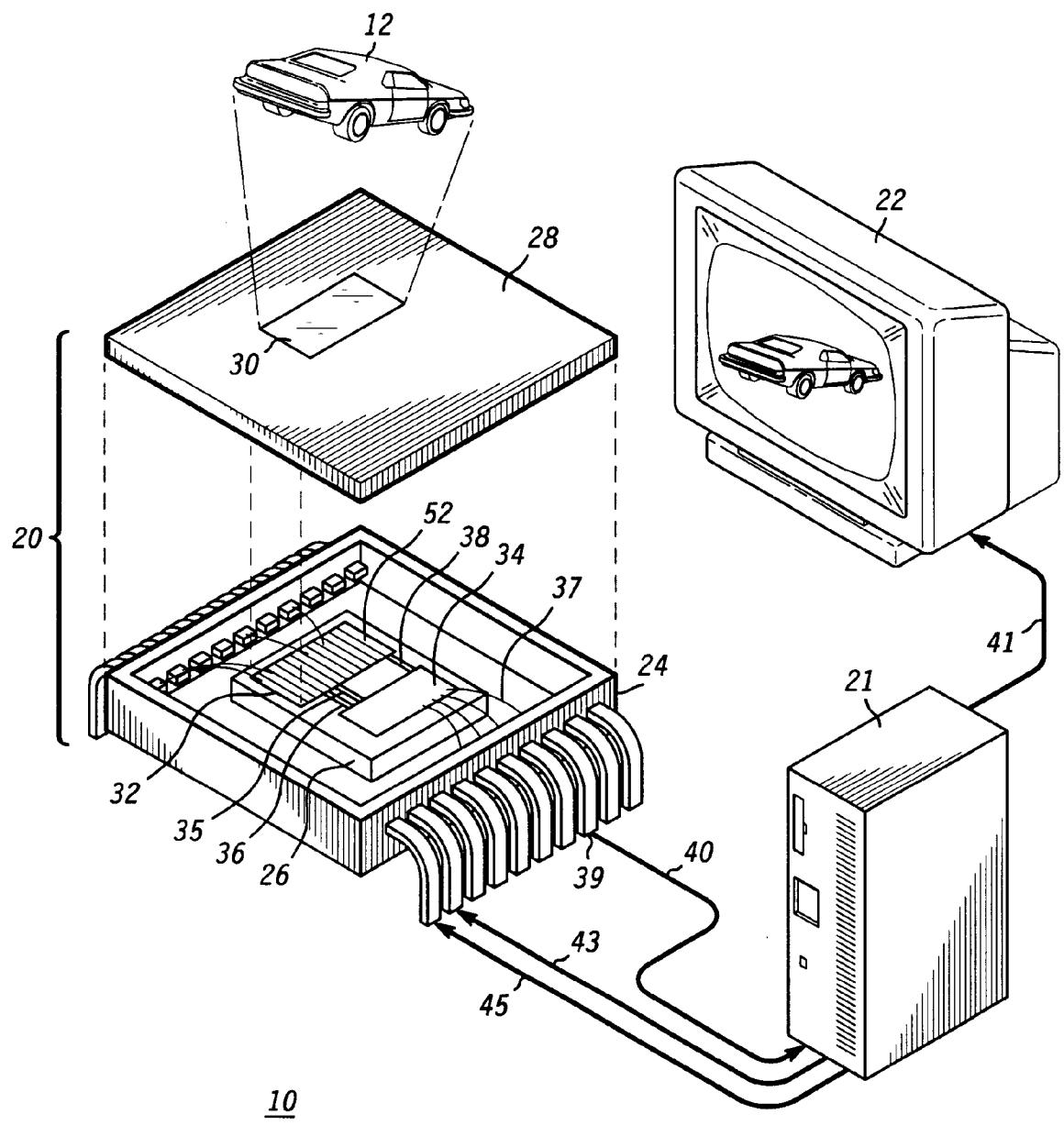
FIG. 1 illustrates a partially exploded isometric view of an image capturing system in accordance with the present invention.

FIG. 1 illustrates a partially exploded isometric view of a scanner 10 or similar image capturing system, including an image capture device 20, a computer 21 and a display device 22. Scanner 10 captures an image 12 for converting to digital data in a format recognizable for displaying by display device 22, as will be described.

A package 24 houses an imaging integrated circuit 26 having a lid 28 with a transparent portion 30 for transmitting light reflected from image 12. The light is projected onto an optical sensor 32 formed in a region of integrated circuit 26. Optical sensor 32 is formed as an array of photoactive semiconductor devices designated as photodetectors functioning as pixel sensors.

Transparent portion 30 operates as a focusing lens to focus light in a focal plane in which optical sensor 32 is disposed. Alternatively, focusing is achieved with an external lens (not shown) interposed between image 12 and sensor 32. Light projected through transparent portion 30 onto the photodetectors of sensor 32 produces analog pixel signals proportional to the light intensity. In many systems, imperfections in transparent portion 30 and/or an external lens result in the intensity of light being nonuniformly transmitted across sensor 32. In other systems, nonuniform pixel signals can be generated in different regions 52 of sensor 32 even when the light intensity is the same, due to thermal gradients or process variations across integrated circuit 26. Such an uneven response of the photodetectors produces objectionable shading of portions of a displayed image.

To compensate for this problem, sensor 32 is subdivided into localized regions 52 within which pixel signals of substantially equal amplitudes are generated when equal light intensities are projected on different photodetectors. The physical size of the regions 52 is determined by the variation in the response to light across sensor 32. When the variation is large, sensor 32 is divided into smaller regions 52 to ensure that the photodetectors within a region 52 have substantially equal light responses. Differences in amplitudes of pixel signals generated by photodetectors in different regions 52 are compensated with a signal processing circuit 34 to reduce or eliminate shadowing. The response to light across sensor 32 depends on lens quality, thermal gradients, etc., of scanner 10.

In the embodiment of FIG. 1, scanner 10 is monochromatic, i.e., senses in black and white, and sensor 32 is configured with one row of 2,752 photodetectors disposed in forty-three regions 52. Hence, each region 52 includes sixty-four photodetectors and their associated selection circuitry. When used in a digital camera, sensor 32 typically is implemented as a row/column matrix of photodetectors rather than as a single row.

Note that numerous other configurations are possible for sensor 32. For example, when scanner 10 is configured to capture color images, color filters can be interposed between an image and sensor 32 so that each photodetector responds to light of a particular color. In an RGB system, sensor 32 may include one row of devices responsive to red light, another row responsive to blue light and a third row responsive to green light. Partitioning into regions can occur within or among these rows to obtain the advantages of the present invention whether or not photodetectors responsive to different colors are combined into the same region. If desired, each photoactive device can be disposed in its own region 52, so that processing circuit 34 compensates for sensitivity differences among any of the photodetectors in sensor 32.

Since a given lens design, lighting system, or process variation often has a predictable and systematic type of shading across a die, the partitioning of sensor 32 into regions 52 typically occurs when scanner 10 is being characterized during its development phase. Alternatively, scanner 10 can be configured with calibration circuitry to allow a user to adjust the number of regions as needed.

Signal processing circuit 34 receives user selected starting and ending addresses on a node 45 from computer 21 to define the scan boundaries. These addresses are used to generate address data on conductors 35 and 36 for selecting the photodetectors whose pixel signals are provided on a bus 38. Circuit 34 processes the pixel signals to produce digital imaging data at a wire bond 37 and a lead 39 of package 24. In alternative applications, parallel imaging data is provided on multiple leads and transferred on a bus to computer 21.

Computer 21 is a digital signal processing device programmed to generate the starting and ending scan addresses and to provide control data to circuit 34. Each region 52 of sensor 32 has a corresponding value of control data which is used to compensate for differences in the sensitivity of photodetectors as will be described. Computer 21 also receives the digital imaging data from circuit 34 for formatting and viewing on output device 22. Output device 22 is shown as a monitor, but can be another type of device such as a printer, a storage device such as a disk drive, etc.

Figure 2:
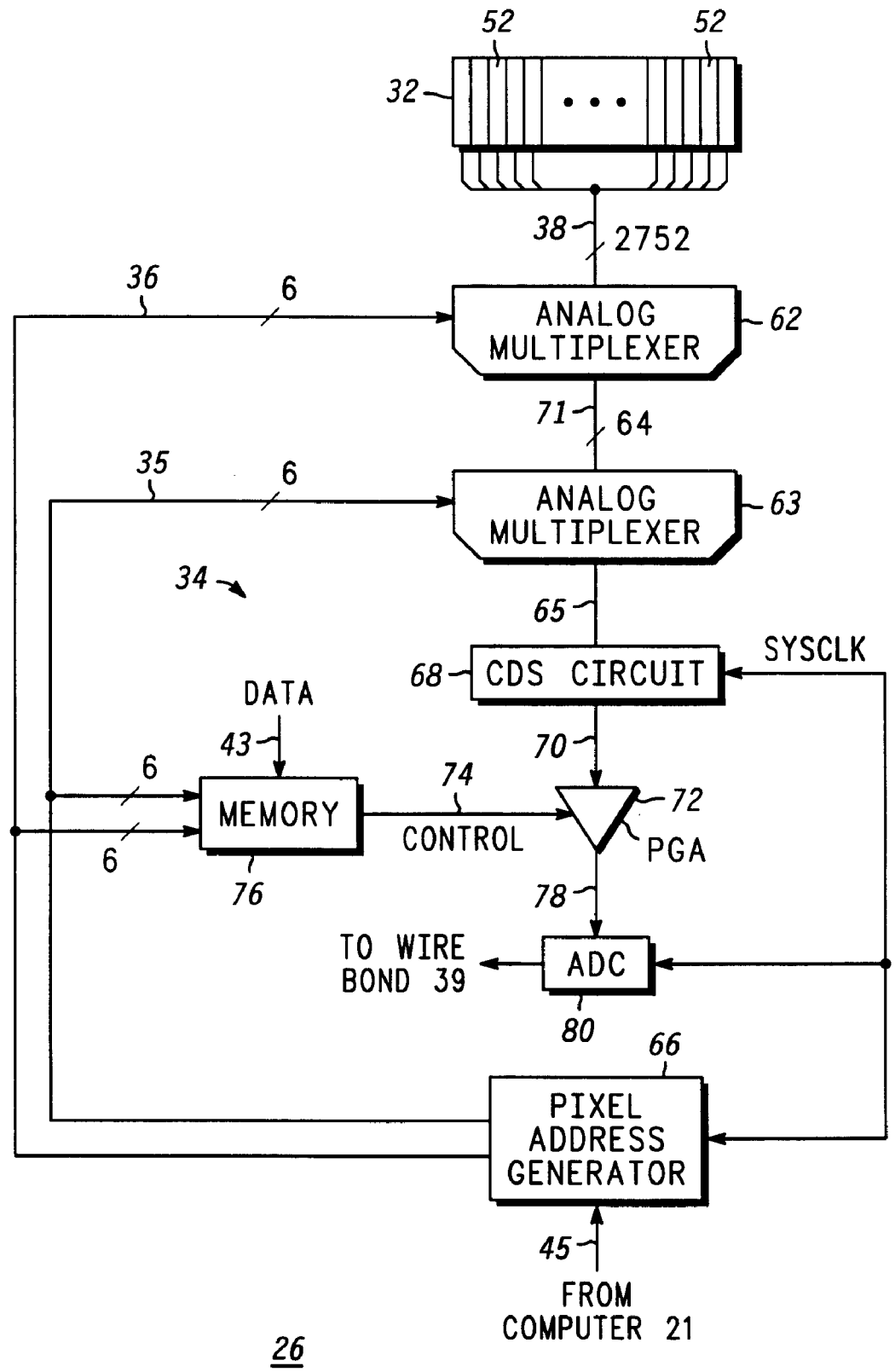
FIG. 2 illustrates a processing circuit for pixel signals in accordance with the present invention.

FIG. 2 illustrates a schematic diagram of integrated circuit 26 including optical sensor 32 and processing circuit 34. Pixel signals generated by sensor 32 are provided in parallel on bus 38. The pixel signals are selected for converting to a serial stream on a node 65 by a two stage multiplexing circuit. The first multiplexing stage includes a multiplexer 62 for selecting one of forty-three regions 52 of sensor 32. Selection is controlled by address data provided on six bit bus 36 from a pixel address generator 66. Hence, multiplexer 62 has 2,752 inputs coupled to bus 38 and sixty-four outputs coupled to a sixty-four bit bus 71 for providing sixty-four pixel signals generated within a selected region. Multiplexer 62 is implemented as a decoding matrix of analog switching devices such as transmission gates to operate as a one of forty-three analog multiplexer.

The second multiplexing stage includes a one of sixty-four analog multiplexer 63 for selecting from among pixel signals within a region 52 selected by multiplexer 62. Inputs of multiplexer 63 are coupled to bus 71 for receiving the pixel signals and a selected pixel signal is provided on node 65. Multiplexer 63 includes a matrix of analog switching devices similar to the matrix of multiplexer 62. Pixel signals within a region 52 are selected with address data provided on six bit bus 35 from pixel address generator 66.

Pixel address generator 66 receives the starting and ending addresses from computer 21 on node 45 for setting the boundaries of a scan. Pixel address generator 66 includes one or more programmable counters which are incremented with a system clock SYSCLK to produce the series of binary pixel addresses on buses 35 and 36. The binary pixel addresses are applied to multiplexers 62 and 63 to produce a serial stream of pixel signals on node 65.

A correlated double sampling (CDS) circuit 68 operates as a sample and hold sense amplifier that extracts projected light information from the pixel signals while rejecting system noise. An input is coupled to node 65 to sense the pixel signals to provide a stream of analog sense signals at an output coupled to a node 70. The sample and hold functions are timed from system clock SYSCLK to synchronize with the rate of the pixel signals. Correlated double sampling is a standard method used in imaging circuits to sense pixel signals. Briefly stated, a selected pixel signal has two portions: a reference (or dark) portion whose amplitude is indicative of a zero light condition, and a signal (or light) portion whose amplitude is indicative of the intensity of the light projected on the photodetector to generate the pixel signal. The reference level is sampled by CDS circuit 68 on one transition of SYSCLK and the signal level is sampled on another SYSCLK transition while holding the reference level. CDS circuit 68 subtracts the reference level from the signal level and amplifies the difference to produce an analog sense signal on node 70. Hence, analog sense signals contain information regarding the intensity of light projected on corresponding photodetectors.

A programmable gain amplifier (PGA) 72 operates as an analog amplifier whose gain is set with digital CONTROL data received at a control input at a node 74. A signal input is coupled to node 70 to receive the stream of analog sense signals and an output at a node 78 provides an imaging signal stream. PGA 72 amplifies each analog sense signal to a gain whose magnitude is set by the applied value of CONTROL data. Each region 52 has a corresponding value of CONTROL data which typically is set when scanner 10 is characterized 10 during its development phase. Alternative methods of setting CONTROL values can take advantage of the inherent mapping between areas of a displayed image and regions 52 of sensor 32. For example, a user can capture a white image and view it on display device 22 while manually adjusting CONTROL data through a graphics interface to compensate for shadowy areas created by different responses to light of different regions 52.

A memory circuit 76 stores CONTROL data transferred from computer 21 on conductor 43. An output is coupled to node 74 for providing CONTROL data to PGA 72. Note that pixel addresses are applied to memory circuit 76 to retrieve CONTROL data while being applied to multiplexers 62 and 63 to select pixel signals, so the same pixel addresses that control multiplexers 62 and 63 are used to access CONTROL data from memory circuit 76. Therefore, as analog sense signals are amplified through PGA 72, the correct CONTROL data is retrieved from memory circuit 76 on node 74 to dynamically alter the gain of PGA 72 to compensate for the different sensitivities of regions 52 to light. In effect, altering the gain "on the fly" spatially compensates for these nonuniformities across sensor 32 to produce higher quality displayed images.

The imaging signal stream on node 78 is applied to the input of an analog to digital converter (ADC) 80 for converting to digital imaging data at an output coupled to wire bond 39. Recall that the imaging signal stream is provided at a rate set by SYSCLK. To synchronize with the imaging signal stream, ADC 80 is clocked with SYSCLK to convert the imaging signal stream to digital imaging data as it is received.

Figure 3:
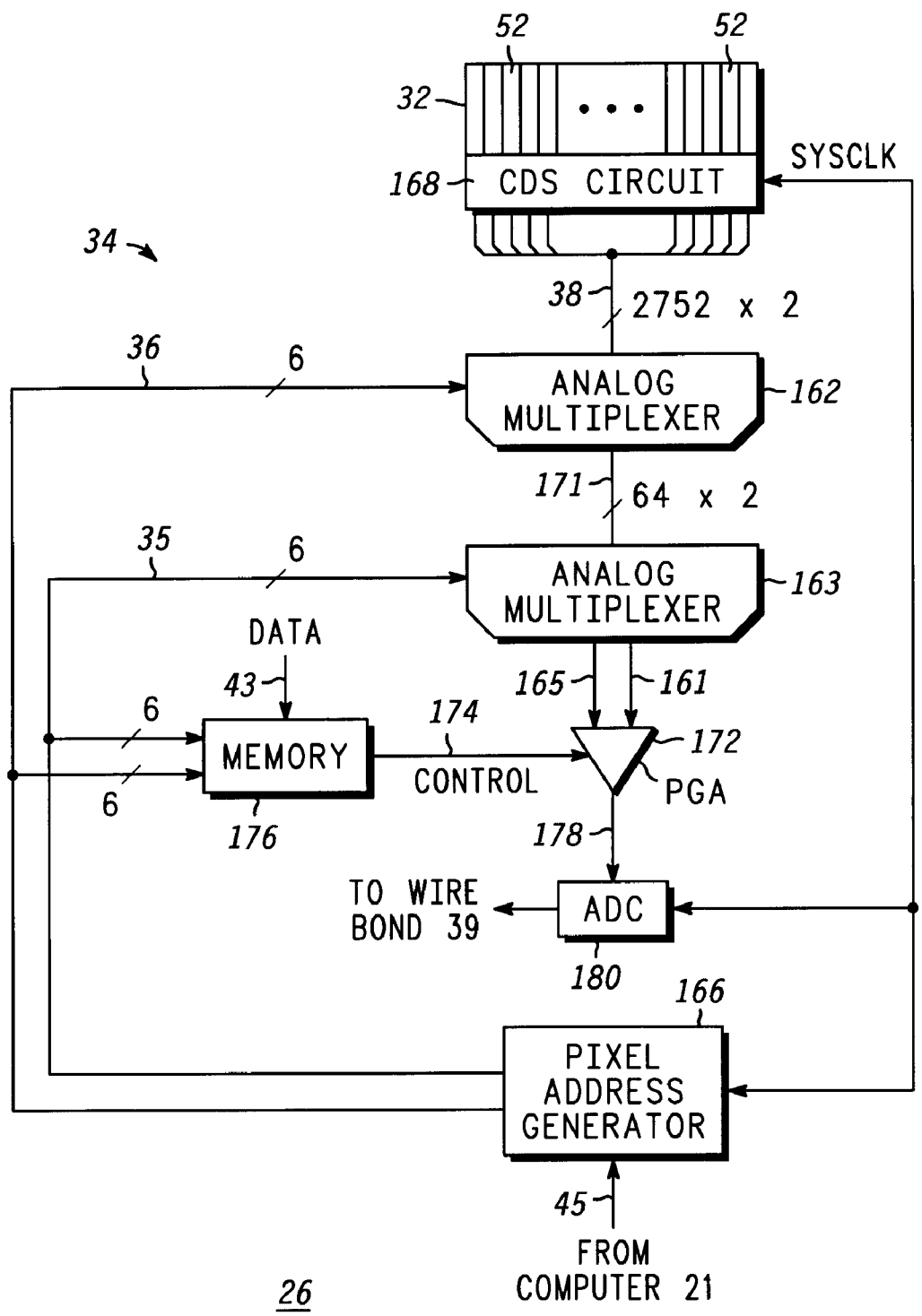
FIG. 3 illustrates an alternate embodiment of a processing circuit for pixel signals in accordance with the present invention.

FIG. 3 illustrates a schematic diagram of imaging integrated circuit 26 in an alternate embodiment, including optical sensor 32 and signal processing circuit 34.

Optical sensor 32 includes 2,752 photodetectors coupled to a CDS circuit 168 having 2,752×2=5,504 sample and hold (S/H) amplifiers. In other words, each photodetector is coupled to two S/H amplifiers, a first S/H amplifier sampling the dark level on one transition of SYSCLK and holding the dark level while a second S/H amplifier samples the light level. The dark levels generated by the photodetectors are concurrently sampled on one SYSCLK transition, and the light levels are sampled on another SYSCLK transition. Hence, the S/H amplifiers perform a correlated double sampling function for the photodetectors.

The dark and light signal levels are provided on separate conductors of bus 38. Hence, bus 38 includes 5,504 conductors to conduct the reference and signal levels for 2,752 photodetectors. By performing the correlated double sampling function in parallel on all of the photodetectors, pixel signals can be processed at a higher rate or, as an alternative, the frequency of SYSCLK can be reduced to reduce switching and other system noise while maintaining the processing rate of pixel signals.

A multiplexer 162 receives pixel addresses on bus 36 to select one of the forty-three regions 52 of sensor 32 in a fashion similar to multiplexer 62 shown in FIG. 2. Hence, the dark and light signal levels on bus 38 are provided at 5,504 inputs of a multiplexer 162. These dark and light signal levels are routed through separate decoding matrices within multiplexer 162 and provided on separate conductors of a bus 171. Hence, multiplexer 162 provides sixty-four dark levels and sixty-four light levels generated within a selected region on to one hundred twenty-eight outputs coupled to a one hundred twenty-eight conductor bus 171.

A one of sixty-four analog multiplexer 163 receives a pixel address on bus 35 and selects from among the dark and light levels of pixel signals within a region 52 selected by multiplexer 162. Multiplexer 163 has 64×2=128 inputs coupled to bus 171 for routing the dark and light levels of selected pixel signals to nodes 161 and 165, respectively.

A PGA 172 performs a function similar to that of PGA 72 (FIG. 2). That is, PGA 172 receives a series of dark and light signal levels and amplifies their differences to produce an imaging signal stream at node 178.

A memory circuit 176, an ADC 180 and a pixel address generator 166 are configured to operate in a fashion similar to memory circuit 76, ADC 80 and pixel address generator 66, respectively, of FIG. 2.

By now it should be appreciated that the present invention provides a circuit and method of compensating for a nonuniform response across an optical sensor. The nonuniformity results in pixel signals generated in different regions of the optical sensor having different amplitudes for a given intensity of light. The optical sensor is divided into physical regions small enough to ensure that the photodetectors within each region generate substantially equal pixel signals for the given light intensity. A processing circuit compensates for different responses among different regions with a programmable gain amplifier whose gain is adjusted when the regions in which the pixel signals are generated changes.

What is claimed is:

1. An imaging device, comprising:
   an optical sensor having an output for providing pixel signals generated in response to light projected onto regions of the optical sensor; and
   an amplifier having a first input coupled for receiving the pixel signals, a first output for providing an imaging signal, and a control input coupled for receiving control data representative of signal variations from each respective region to amplify the pixel signals to different gains when the pixel signals are generated in different regions of the optical sensor.

2. The imaging device of claim 1, wherein the optical sensor includes a plurality of photoactive devices disposed in the regions of the optical sensor.

3. The imaging device of claim 2, wherein the optical sensor has an address input coupled for receiving pixel addresses for selecting the pixel signals in different orders.

4. An imaging device comprising:
   an optical sensor including a plurality of photoactive devices disposed in regions of the optical sensor, said optical sensor having a output for providing pixel signals generated in response to light projected onto regions of the optical sensor, the optical sensor having an address input coupled for receiving pixel addresses for selecting the pixel signals in different orders;
   an amplifier having a first input coupled for receiving the pixel signals, a first output for providing an imaging signal, and a control input coupled for receiving control data representing a predetermined region characterization to amplify the pixel signals to different gains when the pixel signals are generated in different regions of the optical sensor; and
   a memory circuit for storing the control data, the memory circuit having an address input coupled for receiving the pixel addresses and an output coupled to the control input of the amplifier.

5. Imaging device of claim 4, wherein the optical sensor includes a multiplexer having a first input coupled to the output of the optical sensor, and a selection input coupled to the address input of the optical sensor for selecting among photoactive devices of the optical sensor to provide the pixel signals.

6. The imaging device of claim 4, further comprising analog to digital converter having an input coupled for receiving the imaging signal and an output for providing imaging data.

7. A method of capturing an image, comprising:
   altering a gain of pixel signals through an amplifier having a control input in response to control data to compensate for a difference in response to light projected on different regions of an optical sensor;
   storing the control data in a memory circuit having an address input coupled for receiving the pixel address and an output coupled to the control input of the amplifier; and
   retrieving the control data with address data.

8. The method of claim 7, further comprising the step of projecting light from the image onto first and second regions of the optical sensor to generate first and second pixel signals, respectively.

9. The method of claim 8, wherein the step of altering includes the steps of:
   amplifying the first pixel signal through the amplifier to a first gain; and
   amplifying the second pixel signal through the amplifier to a second gain.

10. The method of claim 9, wherein the first pixel signal has a first amplitude when a light intensity is projected on the first region of the optical sensor, the second pixel signal has a second amplitude less than the first amplitude when the light intensity is projected on the second region of the optical sensor, and the step of amplifying the second pixel signal includes the step of amplifying the second pixel signal through the amplifier to the second gain greater than the first gain.

11. The method of claim 8, further comprising the step of selecting the first and second regions of the optical sensor with address data to produce the first and second pixel signals.

12. The method of claim 11, wherein the step of selecting includes the step of multiplexing the first and second pixel signals with the address data.

13. The method of claim 7, further comprising the steps of:
   amplifying the pixel signals through the amplifier to produce an imaging signal; and
   converting the imaging signal to digital imaging data for viewing.

14. An image capturing method, comprising the steps of:
   sensing light projected on fast and second regions of an optical sensor to produce first and second pixel signals;
   setting a gain of an amplifier having a control input with first control data representing a known variation of signal from a first predetermined region for amplifying the first pixel signal; and
   altering the gain of the amplifier with second control data representing a known variation of signal from a second predetermined region for amplifying the second pixel signal to equalize the responses of the first and second regions of the optical sensor to the light.

15. The method of claim 14, wherein the first and second pixel signals are amplified to produce a monochrome imaging signal.

16. An imaging device, comprising:

an optical sensor having an output for providing pixel signals generated in response to light projected onto a plurality of regions of the optical sensor, wherein each of the plurality of regions has a corresponding control data representative of signal variations from respective ones of said plurality of regions; and an amplifier having a first input coupled for receiving the pixel signals, a first output for providing an imaging signal, and a control input coupled for receiving the corresponding control data to amplify the pixel signals to different gains according to each of their corresponding signal variations.

\* \* \* \* \*

(12) EX PARTE REEXAMINATION CERTIFICATE (9523rd)
United States Patent
Domer et al.

(10) Number: US 6,583,816 C1
(45) Certificate Issued: Feb. 22, 2013

(54) IMAGING CIRCUIT AND METHOD OF SPATIAL COMPENSATION

(75) Inventors: Steven M. Domer, Mesa, AZ (US); Jeffery E. Bills, Chandler, AZ (US)

(73) Assignee: Intellectual Ventures II LLC, Wilmington, DE (US)

Reexamination Request:
No. 90/012,275, Apr. 27, 2012

Reexamination Certificate for:
Patent No.: 6,583,816
Issued: Jun. 24, 2003
Appl. No.: 09/118,684
Filed: Jul. 17, 1998

Related U.S. Application Data

(63) Continuation-in-part of application No. 09/088,005, filed on Jun. 1, 1998, now abandoned.

(51) Int. Cl.
*H04N 5/217* (2006.01)

(52) U.S. Cl. .............. 348/229.1; 348/302; 348/E5.081

(58) Field of Classification Search .................. None
See application file for complete search history.

(56) References Cited

To view the complete listing of prior art documents cited during the proceeding for Reexamination Control Number 90/012,275, please refer to the USPTO's public Patent Application Information Retrieval (PAIR) system under the Display References tab.

*Primary Examiner* — Minh Dieu Nguyen

(57) ABSTRACT

An imaging system (10) and method compensate for different amplitudes of pixel signals generated by photoactive devices in an optical sensor (32) whose responses to projected light are not uniform. The sensor is divided into regions (52) such that the response of the photoactive devices within a region are substantially equal. A processing circuit (34) compensates for different responses among different regions with a programmable gain amplifier (72) whose gain is dynamically adjusted when pixel signals generated in different regions are received.

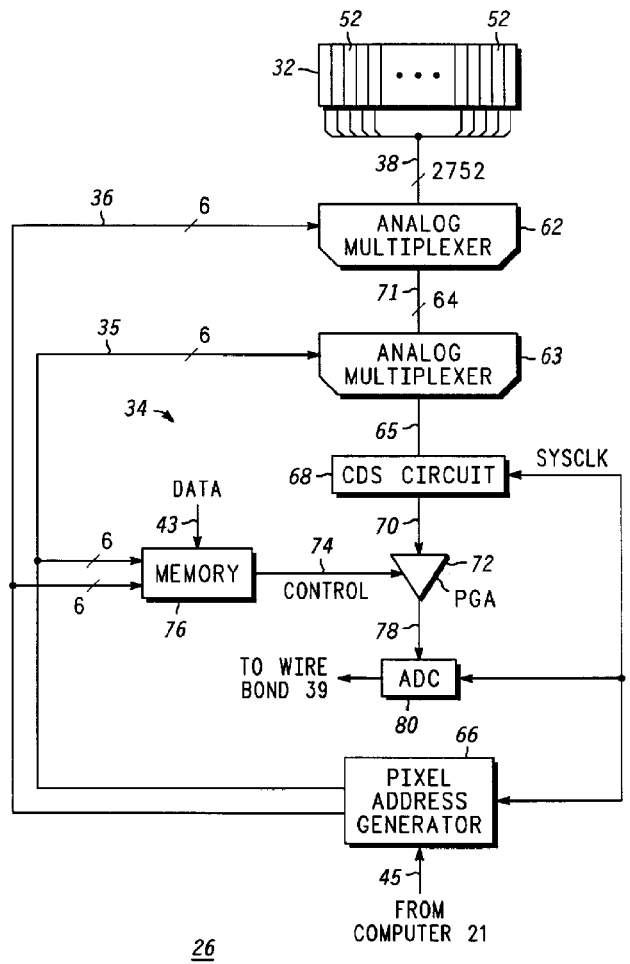

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 14 and 16 are determined to be patentable as amended.

Claims 2, 8-10, 13 and 15, dependent on an amended claim, are determined to be patentable.

New claims 17-98 are added and determined to be patentable.

Claims 3-6 and 11-12 were not reexamined.

1. An imaging device, comprising:
   an optical sensor having an output for providing pixel signals generated in response to light projected onto regions of the optical sensor; and
   an amplifier having a first input coupled for receiving the pixel signals, a first output for providing an imaging signal, and a control input coupled for receiving control data representative of signal variations from each respective region to amplify the pixel signals to different gains when the pixel signals are generated in different regions of the optical sensor[.],
   *wherein at least one of the regions includes a plurality of pixels, and the at least one of the regions maps to a single corresponding value of the control data.*

7. A method of capturing an image, comprising:
   altering a gain of pixel signals through an amplifier having a control input in response to control data to compensate for a difference in response to light projected on different regions of an optical sensor, *wherein the control data is representative of signal variations from each respective region, wherein at least one of the different includes a plurality of pixels, and wherein the at least one of the different regions maps to a single corresponding value of the control data*;
   storing the control data in a memory circuit having an address input coupled for receiving [the] *a* pixel address and an output coupled to the control input of the amplifier; and
   retrieving the control data with address data.

14. An image capturing method, comprising the steps of:
   sensing light projected on [fast] *first* and second *predetermined* regions of an optical sensor to produce first and second pixel signals;
   setting a gain of an amplifier having a control input with first control data representing a known *signal* variation of [signal from a] *the* first predetermined region for amplifying the first pixel signal, *wherein the first predetermined region includes a plurality of pixels, wherein the first predetermined region is mapped to the first control data and wherein the first control data is a single value of control data*; and
   altering the gain of the amplifier with second control data representing a known *signal* variation of [signal from a] *the* second predetermined region for amplifying the second pixel signal to equalize [the] responses of the first and second *predetermined* regions of the optical sensor to the light.

16. An imaging device, comprising:
   an optical sensor having an output for providing pixel signals generated in response to light projected onto a plurality of regions of the optical sensor, wherein each of the plurality of regions [has] *maps to a single* corresponding control data representative of signal variations from respective ones of said plurality of regions; and
   an amplifier having a first input coupled for receiving the pixel signals, a first output for providing an imaging signal, and a control input coupled for receiving the corresponding control data to amplify the pixel signals to different gains according to each of their corresponding signal variations[.],
   *wherein at least one of the regions includes a plurality of pixels.*

17. *The imaging sensor of claim 1, wherein the optical sensor includes a plurality of pixels that generate the pixel signals, the plurality of pixels of the optical sensor being arranged in a row/column matrix.*

18. *The imaging device of claim 1, wherein boundaries of the regions are set based on signals produced by pixels of the optical sensor in response to light.*

19. *The imaging device of claim 1, wherein the plurality of pixels of the at least one of the regions each generate pixel signals having substantially the same amplitude in response to exposure to a same intensity light.*

20. *The imaging device of claim 1, wherein sizes of the regions are determined based on variations in responsivity of pixels in the optical sensor.*

21. *The imaging device of claim 1, wherein the optical sensor includes a plurality of rows of pixels, each row of pixels being configured to detect one of a plurality of colors.*

22. *The imaging device of claim 21, wherein the at least one of the regions includes one or more rows of pixels from among the plurality of rows of pixels.*

23. *The imaging device of claim 22, wherein the at least one of the regions includes a first row of pixels configured to detect light of a first color and a second row of pixels configured to detect light of a second color.*

24. *The imaging device of claim 22, wherein the one or more rows of pixels is a plurality of rows of pixels that are each configured to detect light of a same color.*

25. *The imaging device of claim 21, wherein each of the regions is confined to one or more pixels within a single row.*

26. *The imaging device of claim 1, further comprising calibration circuitry configured to adjust the regions.*

27. *The imaging device of claim 26, wherein the calibration circuitry is configured to adjust the regions in response to user input.*

28. *The imaging device of claim 26, wherein the calibration circuitry is configured to adjust a number of the regions.*

29. *The imaging device of claim 26, wherein the calibration circuitry is configured to adjust at least one of a distribution and a layout of the regions.*

30. *The imaging device of claim 1, further comprising:*
   *a first multiplexer configured to select one region from among the regions; and*
   *a second multiplexer configured to receive pixel signals of the selected one region from the first multiplexer, and to select one pixel signal from among the received pixel signals.*

31. *The imaging device of claim 30, wherein the first multiplexer selects the one region based on a pixel address, and* wherein the second multiplexer selects the one pixel signal based on the pixel address.

32. The imaging device of claim 31, further comprising a memory configured to store the control data, and to forward the control data to the amplifier based on the pixel address.

33. The imaging device of claim 32, wherein the memory is configured to store, for each of the regions, a single control data entry.

34. The imaging device of claim 1, wherein the control data includes control values that each correspond to one of the regions.

35. The imaging device of claim 1, wherein sizes of the regions are determined based on at least one of a lens quality and aberrations in an optical path.

36. The imaging device of claim 1, further comprising a multiplexer configured to provide pixel signals from within a selected region to the amplifier.

37. The device of claim 1, further comprising calibration circuitry configured to adjust the control data.

38. The method of claim 7, wherein the control data is retrieved from the memory circuit using the pixel address as the address data.

39. The method of claim 7, wherein the optical sensor includes a plurality of pixels that generate the pixel signals, the plurality of pixels of the optical sensor being arranged in a row/column matrix.

40. The method of claim 7, further comprising setting boundaries of the regions based on signals produced by pixels of the optical sensor in response to light.

41. The method of claim 7, wherein the plurality of pixels of the at least one of the regions each generate pixel signals having substantially the same amplitude in response to exposure to a same intensity of light.

42. The method of claim 7, further comprising determining sizes of the regions based on variations in light responsivity of pixels in the optical sensor.

43. The method of claim 7, wherein the optical sensor includes a plurality of rows of pixels, each row of pixels being configured to detect one of a plurality of colors.

44. The method of claim 43, wherein the at least one of the different regions includes one or more rows of pixels from among the plurality of rows of pixels.

45. The method of claim 44, wherein the at least one of the different regions includes a first row of pixels configured to detect light of a first color and a second row of pixels configured to detect light of a second color.

46. The method of claim 44, wherein the one or more rows of pixels is a plurality of rows of pixels that are each configured to detect light of a same color.

47. The method of claim 43, wherein each of the different regions is confined to one or more pixels within a single row.

48. The method of claim 7, further comprising adjusting the different regions using calibration circuitry.

49. The method of claim 48, wherein the adjusting is performed by the calibration circuitry in response to user input.

50. The method of claim 48, wherein the adjusting includes adjusting a number of the different regions.

51. The method of claim 48, wherein the adjusting includes adjusting at least one of a distribution and a layout of the different regions.

52. The method of claim 7, further comprising:
selecting one region from among the different regions using a first multiplexer; and
selecting one pixel signal from among pixels signals of the selected one region using a second multiplexer.

53. The method of claim 52, wherein the selecting of the one region is based on a pixel address, and wherein the selecting of the one pixel signal is based on the pixel address.

54. The method of claim 53, further comprising:
storing the control data in memory;
accessing the stored control data based on the pixel address.

55. The method of claim 54, wherein the storing stores, for each of the different regions, a single control data entry.

56. The method of claim 7, wherein the control data includes control values that each correspond to one of the different regions.

57. The method of claim 7, wherein sizes of the regions are determined based on at least one of a lens quality and aberrations in an optical path.

58. The method of claim 7, further comprising adjusting the control data using calibration circuitry.

59. The method of claim 14, wherein the optical sensor includes a plurality of pixels that generate the pixel signals, the plurality of pixels of the optical sensor being arranged in a row/column matrix.

60. The method of claim 14, further comprising setting boundaries of the first predetermined region and the second predetermined region based on signals produced by pixels of the optical sensor in response to light.

61. The method of claim 14, wherein the plurality of pixels of the first predetermined region each generate pixel signals having substantially the same amplitude in response to exposure to a same intensity of light.

62. The method of claim 14, further comprising determining sizes of the first predetermined region and the second predetermined region based on variations in light responsivity of pixels in the optical sensor.

63. The method of claim 14, wherein the optical sensor includes a plurality of rows of pixels, each row of pixels being configured to detect one of a plurality of colors.

64. The method of claim 63, wherein the first predetermined region includes one or more of the plurality of rows of pixels.

65. The method of claim 64, wherein the first predetermined region includes a first row of pixels configured to detect light of a first color and a second row of pixels configured to detect light of a second color.

66. The method of claim 64, wherein the one or more rows of pixels is a plurality of rows of pixels that are each configured to detect light of a same color.

67. The method of claim 63, wherein the first predetermined region and the second predetermined region are each confined to one or more pixels within a single row.

68. The method of claim 14, further comprising adjusting at least one of the first predetermined region and the second predetermined region using calibration circuitry.

69. The method of claim 68, wherein the adjusting is performed by the calibration circuitry in response to user input.

70. The method of claim 68, wherein the adjusting includes adjusting a number of regions.

71. The method of claim 68, wherein the adjusting includes adjusting at least one of a distribution and a layout of at least one of the first predetermined region and the second predetermined region.

72. The method of claim 14, further comprising:
selecting of the first predetermined region or the second predetermined region using a first multiplexer; and
selecting one pixel signal from among pixel signals of the selected region using a second multiplexer.

73. The method of claim 72, wherein the selecting of the one region is based on a pixel address, and wherein the selecting of the one pixel signal is based on the pixel address.

74. The method of claim 71, further comprising:
storing the control data in memory; and
accessing the stored control data based on the received pixel address.

75. The method of claim 74, wherein the storing stores, for each of the first predetermined region and the second predetermined region, a single control data entry.

76. The method of claim 14, wherein the control data includes control values that each correspond to one of the regions.

77. The method of claim 14, wherein sizes of the first predetermined region and the second predetermined region are determined based on at least one of a lens quality and aberrations in an optical path.

78. The method of claim 14, further comprising adjusting the control data using calibration circuitry.

79. The imaging sensor of claim 16, wherein the optical sensor includes a plurality of pixels that generate the pixel signals, the plurality of pixels of the optical sensor being arranged in a row/column matrix.

80. The imaging device of claim 16, wherein boundaries of the plurality of regions are set based on signals produced by pixels of the optical sensor in response to light.

81. The imaging device of claim 16, wherein the plurality pixels of the at least one of the regions each generate pixel signals having substantially the same amplitude in response to exposure to a same intensity of light.

82. The imaging device of claim 16, wherein sizes of the plurality of regions are determined based on variations in responses to light by pixels in the optical sensor.

83. The imaging device of claim 16, wherein the optical sensor includes a plurality of rows of pixels, each row of pixels being configured to detect one of a plurality of colors.

84. The imaging device of claim 83, wherein the at least one of the regions includes one or more of the plurality of rows of pixels.

85. The imaging device of claim 84, wherein the at least one of the regions includes a first row of pixels configured to detect light of a first color and a second row of pixels configured to detect light of a second color.

86. The imaging device of claim 84, wherein the one or more rows of pixels is a plurality of rows of pixels that are each configured to detect light of a same color.

87. The imaging device of claim 83, wherein each of the plurality of regions is confined to one or more pixels within a single row of pixels.

88. The imaging device of claim 16, further comprising calibration circuitry configured to adjust the plurality of regions.

89. The imaging device of claim 88, wherein the calibration circuitry is configured to adjust the plurality of regions in response to user input.

90. The imaging device of claim 88, wherein the calibration circuitry is configured to adjust a number of regions.

91. The imaging device of claim 88, wherein the calibration circuitry is configured to adjust at least one of a distribution and a layout of the plurality of regions.

92. The imaging device of claim 16, further comprising:
a first multiplexer configured to select one region from among the plurality of regions; and
a second multiplexer configured to receive pixel signals of the selected one region from the first multiplexer, and to select one pixel signal from among the received pixel signals.

93. The imaging device of claim 92, wherein the first multiplexer selects the one region based on a pixel address, and
wherein the second multiplexer selects the one pixel signal based on the pixel address.

94. The imaging device of claim 92, further comprising a memory configured to store the control data, and to forward the control data to the amplifier based on the pixel address.

95. The imaging device of claim 16, wherein the control data includes control values that each correspond to one of the plurality of regions.

96. The imaging device of claim 16, wherein sizes of the plurality of regions are determined based on at least one of a lens quality and aberrations in an optical path.

97. The imaging device of claim 16, further comprising a multiplexer configured to provide pixel signals from within a selected region to the amplifier.

98. The imaging device of claim 16, further comprising calibration circuitry configured to adjust the control data.

\* \* \* \* \*